(12) United States Patent
Enyedy et al.

(10) Patent No.: US 10,279,414 B2
(45) Date of Patent: May 7, 2019

(54) ENGINE DRIVE WELDER AND METHODS AND SYSTEMS OF CONTROLLING THE SAME

(71) Applicant: LINCOLN GLOBAL, INC., City of Industry, CA (US)

(72) Inventors: Edward Enyedy, Eastlake, OH (US); Adam M. Hruska, Chardon, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 944 days.

(21) Appl. No.: 14/820,103

(22) Filed: Aug. 6, 2015

(65) Prior Publication Data

US 2017/0036289 A1 Feb. 9, 2017

(51) Int. Cl.
*B23K 9/10* (2006.01)

(52) U.S. Cl.
CPC .......... *B23K 9/1006* (2013.01); *B23K 9/1081* (2013.01)

(58) Field of Classification Search
CPC ..... B23K 9/095; B23K 9/1006; B23K 9/1081
USPC ........................................... 219/133, 137 PS
See application file for complete search history.

(56) References Cited

U.S. PATENT DOCUMENTS

| | | |
|---|---|---|
| 3,597,623 A | 8/1971 | Gilardi |
| 5,406,050 A * | 4/1995 | Macomber ........... B23K 9/1068 219/130.1 |
| 5,591,362 A | 1/1997 | Feldhausen et al. |
| 6,121,691 A | 9/2000 | Renner |
| 6,570,132 B1 | 5/2003 | Brunner et al. |
| 6,603,097 B2 | 8/2003 | Leisner et al. |
| 6,636,776 B1 | 10/2003 | Barton et al. |
| 6,818,860 B1 * | 11/2004 | Stava ................... B23K 9/1006 219/130.1 |
| 6,982,398 B2 | 1/2006 | Albrecht |
| 7,180,029 B2 | 2/2007 | Ott |
| 7,205,503 B2 | 4/2007 | Reynolds et al. |
| 7,245,875 B2 | 7/2007 | Clark et al. |
| 7,247,814 B2 | 7/2007 | Ott |
| 7,291,808 B2 | 11/2007 | Burgstaller et al. |

(Continued)

FOREIGN PATENT DOCUMENTS

| | | |
|---|---|---|
| EP | 2 002 917 A1 | 1/2005 |
| EP | 1500456 | 1/2005 |
| WO | 2013184593 | 12/2013 |

OTHER PUBLICATIONS

Classic 300D KUBOTA Operators Manual; Lincoln Global, Inc.; http://www.lincolnelectric.com/assets/servicenavigator-public/lincoln3/im843.pdf; Nov. 2008; pp. 1-37.

(Continued)

*Primary Examiner* — Brian W Jennison

(57) ABSTRACT

Embodiments of the present invention are engine drive welding and/or cutting systems which optimize the utilization of engine drive systems, including hybrid engine drive systems. Embodiments include modular systems which allow for the remote utilization of a battery powered module which can be separated from an engine drive generator power supply. Other embodiments include engine drive power supplies that can communicate with a load coupled to the power supply, such as welders, cutters and wire feeders to determine an optimum operational level. Further embodiments include engine drive power supplies that can be coupled together to optimize fuel and system usage.

18 Claims, 7 Drawing Sheets

(56) References Cited

U.S. PATENT DOCUMENTS

| | | | |
|---|---|---|---|
| 7,375,304 | B2 | 5/2008 | Kainec et al. |
| 7,381,922 | B2 | 6/2008 | Ulrich |
| 7,643,890 | B1 | 1/2010 | Hillen et al. |
| 7,761,336 | B1 | 7/2010 | Blankenship et al. |
| 7,902,484 | B2 | 3/2011 | Ulrich |
| 8,338,971 | B2 | 12/2012 | Radtke et al. |
| 8,487,216 | B2 | 7/2013 | Reynolds et al. |
| 8,592,724 | B2 | 11/2013 | Ott |
| 8,642,921 | B2 | 2/2014 | Savopoulos |
| 8,658,940 | B2 | 2/2014 | Reynolds et al. |
| 8,957,344 | B2 | 2/2015 | Rappl et al. |
| 8,987,638 | B2 | 3/2015 | Hiroi et al. |
| 9,012,807 | B2 | 4/2015 | Ott et al. |
| 9,162,311 | B2 | 10/2015 | Ott |
| 9,180,544 | B2 | 11/2015 | Luck et al. |
| 9,302,340 | B2 | 4/2016 | Bland et al. |
| 9,796,037 | B2 | 10/2017 | Beeson et al. |
| 2005/0016975 | A1 | 1/2005 | Reynolds |
| 2005/0205541 | A1 | 9/2005 | Burgstaller |
| 2005/0263514 | A1* | 12/2005 | Albrecht ............... B23K 9/1006 219/133 |
| 2006/0027546 | A1 | 2/2006 | Reynolds |
| 2006/0076335 | A1 | 4/2006 | Reynolds |
| 2006/0086706 | A1 | 4/2006 | Ulrich |
| 2006/0213892 | A1 | 9/2006 | Ott |
| 2008/0116176 | A1 | 5/2008 | Ulrich |
| 2008/0116185 | A1 | 5/2008 | Luck |
| 2008/0308540 | A1 | 12/2008 | Hiroi |
| 2008/0308541 | A1 | 12/2008 | Hiroi |
| 2009/0057285 | A1* | 3/2009 | Bashore ................ B23K 9/32 219/130.1 |
| 2009/0272221 | A1 | 11/2009 | Long et al. |
| 2010/0122974 | A1 | 5/2010 | Savopoulos |
| 2010/0314375 | A1* | 12/2010 | Kaufman ............ B23K 9/1081 219/137.71 |
| 2011/0220619 | A1* | 9/2011 | Mehn ................... B23K 9/0953 219/108 |
| 2012/0138587 | A1 | 6/2012 | Fosbinder et al. |
| 2013/0264319 | A1 | 10/2013 | Temby et al. |
| 2013/0319987 | A1* | 12/2013 | Beistle ................ B23K 9/1087 219/132 |
| 2013/0319988 | A1 | 12/2013 | Beistle et al. |
| 2014/0076872 | A1 | 3/2014 | Ott |
| 2014/0238964 | A1* | 8/2014 | Casner ................ B23K 9/1087 219/132 |
| 2015/0048072 | A1* | 2/2015 | Borchert ............. B23K 9/1006 219/130.1 |
| 2016/0311046 | A1 | 10/2016 | Aguilar |
| 2016/0354855 | A1 | 12/2016 | Ulrich |
| 2017/0036290 | A1 | 2/2017 | Enyedy et al. |
| 2017/0036291 | A1 | 2/2017 | Enyedy et al. |
| 2017/0266747 | A1 | 9/2017 | Stockton |

OTHER PUBLICATIONS

Pipeliner 200D Operator's Manual; Lincoln Global, Inc.; https://www.lincolnelectric.com/assets/servicenavigator-public/lincoln3/IM769.pdf; Oct. 2004; pp. 1-34.

Miller; Trailblazer 325 & 275; https://www.constructionequipment.com/miller-trailblazer-325-275-weldergenerators-reduce-fuel-use-and-sound; Sep. 10, 2012; pp. 1-5.

Lincoln Global, Inc.; Outback; 185 http://www.icomsrl.com.bo/pdf/lincoln/motosoldadoras/Outback%20185.pdf; Publication E6.70; Apr. 2010; pp. 1-4.

Logan Contractors Supply, Inc.; 2016 Muiltiquip DLW330X2; http://www.logancontractors.com/showrooms/Multiquip/Generators/Welder+and+Generators/DLW330X2/56d8822a27818608258b52713/: 2016; pp. 1-2.

\* cited by examiner

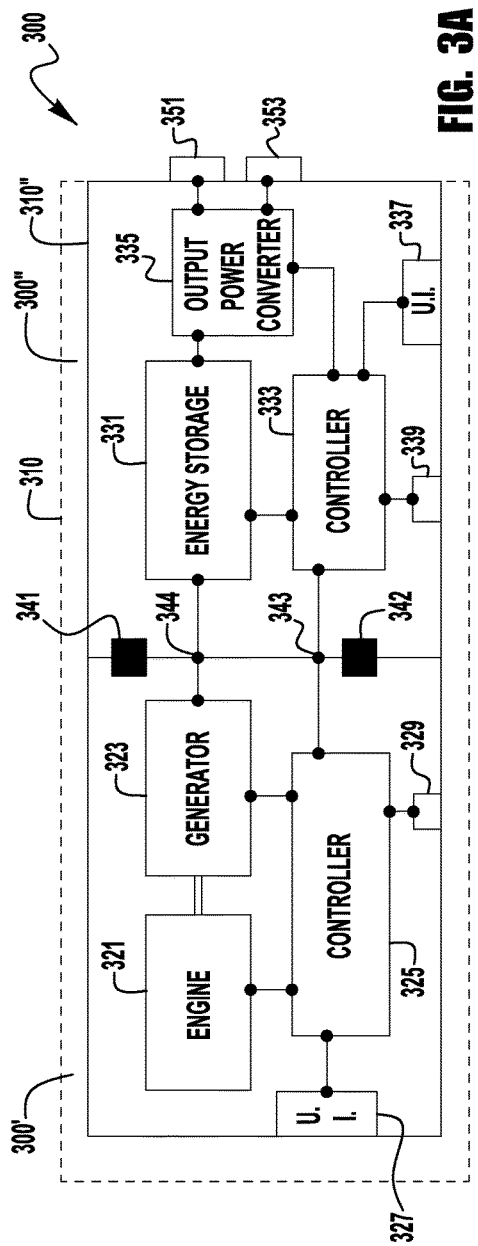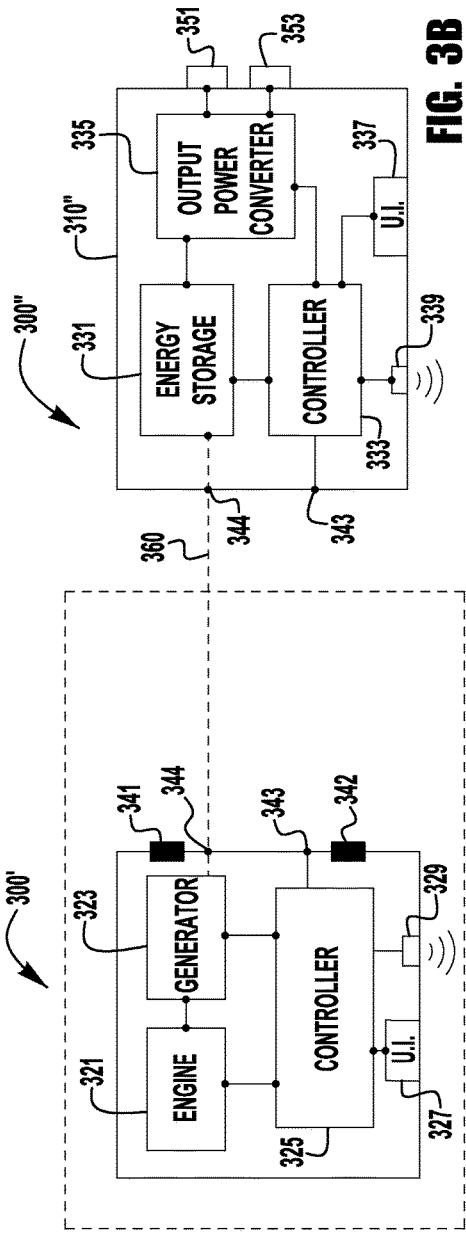
FIG. 3A
FIG. 3B

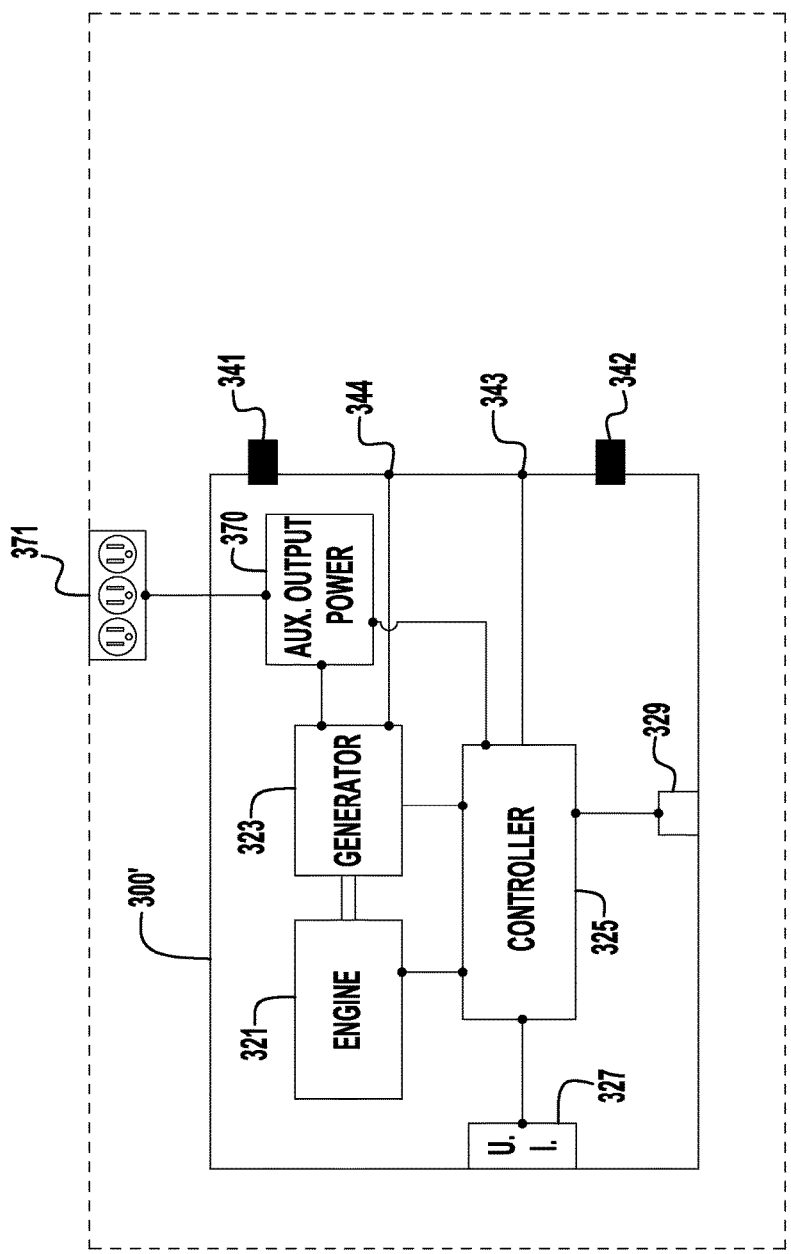

ENGINE DRIVE WELDER AND METHODS AND SYSTEMS OF CONTROLLING THE SAME

TECHNICAL FIELD

Devices, systems, and methods consistent with embodiments of the present invention relate to hybrid engine drive welders, and more specifically to engine drive welders and power systems having increased versatility and control options.

BACKGROUND

The construction and use of engine driven welders is well known. Such welders are often used when utility power grids are either not available or not reliable. In such welders, an engine and generator combination are used to generate power which is used by an output circuit to generate an output power. In an effort to improve on these systems, hybrid engine drive welders have been developed where the welder includes an energy storage device, such as a battery. The battery can be used by the welding system to add to the output power of the system and/or smooth the power provided by the generator to the output circuit—among other uses. Such systems are known and often referred to as hybrid engine drive welders. While advancements have been made for such welding systems to improve their utilization and performance, these systems still have disadvantages in that they are large and their versatility is somewhat limited in certain applications. Thus, improvements are needed to increase the versatility of hybrid engine drive welding systems.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

A first exemplary embodiment of the present invention is A welding or cutting power supply having a first module with an internal combustion engine and a generator coupled to the internal combustion engine, where the generator generates electrical power, and a second module which is physically connectable to and detachable from the first module. The second module has an energy storage device which receives the electrical power when the second module is coupled to the first module and uses the generated electrical power to charge the energy storage device, and the energy storage device generates an output power. The second module also has a power conversion circuit which is coupled to the energy storage device and which generates a welding or cutting output signal to be output from the second module. When the second module is physically coupled to the first module the power conversion circuit uses at least one of the output power and the generated electrical power to generate the welding or cutting output signal, and when the second module is physically removed from the first module the power conversion circuit uses only the output power from the energy storage device to generate the welding or cutting signal. When the second module is physically coupled to the first module the power conversion circuit has a first peak output power and when the second module is physically removed from the first module the power conversion circuit has a second peak output power which is less than the first peak output power.

In a second exemplary embodiment of the present invention, a welding or cutting system has a power generation system which has an internal combustion engine coupled to a generator for generating a power signal, a power conversion circuit which receives the power signal and generates a synchronous output signal, an outlet circuit having at least one outlet which is coupled to the power conversion circuit and receives the synchronous output signal, a first controller which controls an operation of at least the internal combustion engine, and a first communication module which is coupled to the controller. The system also has a welding or cutting power supply coupled to the at least one outlet to receive the synchronous output signal and utilize the synchronous output signal to generate a welding or cutting output signal. The welding or cutting power supply has a second controller to control an operation of the welding or cutting power supply, and a second communication module coupled to the second controller which is in communication with the first communication module. The second controller determines an anticipated power demand for a given welding or cutting operation and generates and sends an anticipated power demand signal to the first communication module, and the first controller uses the anticipated power demand signal to control an RPM speed of the internal combustion engine to adjust a power level of the synchronous output signal.

A third exemplary embodiment is directed to a welding system which has a first welding power generator with a first internal combustion engine, a first generator coupled to the first internal combustion engine which produces a first power output signal, a first energy storage device coupled to the first generator to receive the first power output signal to charge the first energy storage device, a first power conversion circuit coupled to the first energy storage device to receive a first energy storage device power signal and convert the first energy storage device power signal to a first welding output power signal which is output by the first welding power supply, and a first controller which controls an operation of the first welding power generator. The system also includes at least a second welding power generator having a second internal combustion engine, a second generator coupled to the second internal combustion engine which produces a second power output signal, a second energy storage device coupled to the second generator to receive the second power output signal to charge the second energy storage device, a second power conversion circuit coupled to the second energy storage device to receive second energy storage device power signal and convert the second energy storage device power signal to a second welding output power signal which is output by the second welding power supply; and a second controller which controls an operation of the second welding power generator. The first energy storage device is coupled to the second energy storage device such that the second energy storage device can be charged by the first energy storage device when the second internal combustion engine is not operating, and the first and second controllers are in communication with each other to control the charging of the second energy storage device.

BRIEF DESCRIPTION OF THE DRAWINGS

The above and/or other aspects of the invention will be more apparent by describing in detail exemplary embodiments of the invention with reference to the accompanying drawings, in which:

FIGS. 3A and 3B are diagrammatical representations of a first exemplary embodiment of the present invention where the embodiment has a detachable power module;

FIG. 3C is a diagrammatical representation of a further exemplary embodiment of the present invention shown in FIGS. 3A and B;

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to hybrid engine drive welders using a gas or diesel powered engine to power a generator, which generates power for a welding operation. Further, exemplary welders can also generate auxiliary power which can be used to power accessories connected to the welder. Further, exemplary embodiments can use the generator power to provide energy to an energy storage device (e.g., a battery) which can store energy and provide that energy to the output power of the welder as needed. However, exemplary embodiments of the present invention are not limited to power supplies which provide a welding power but can also be used to provide a cutting power or any other power as desired.

Figure 1:
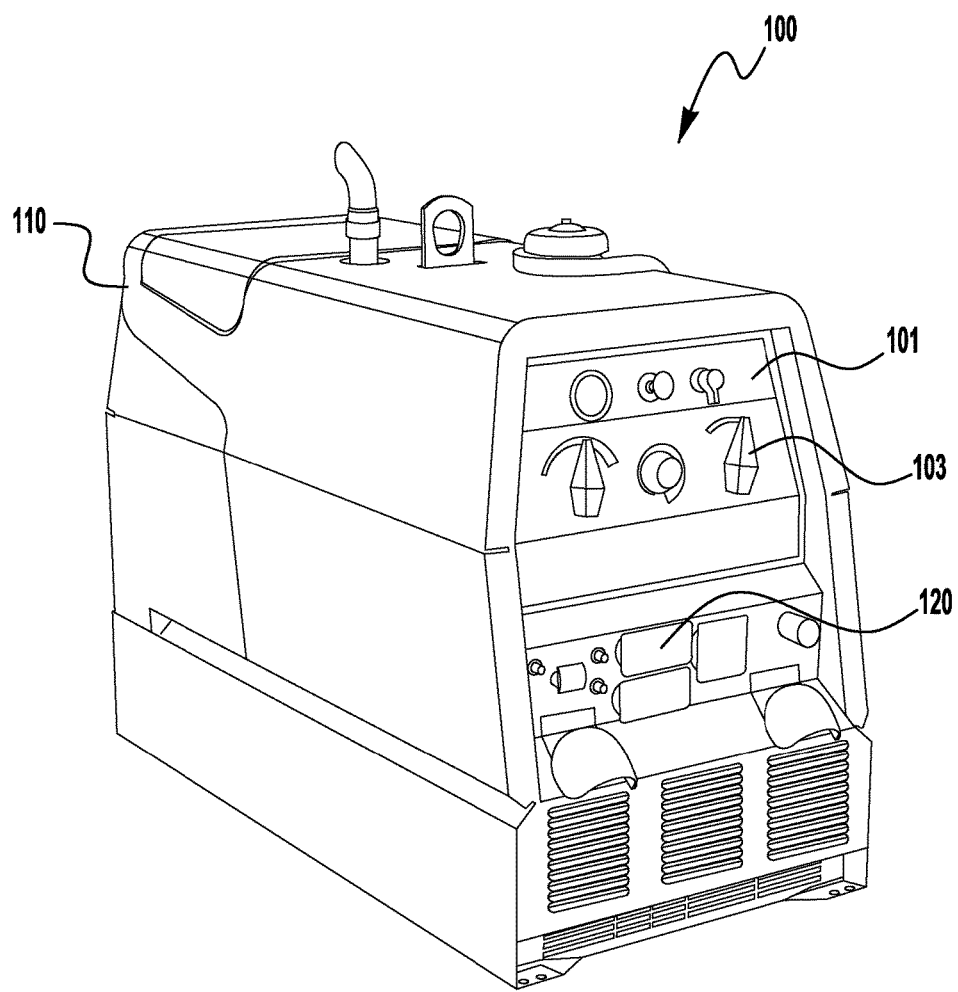
FIG. 1 is a diagrammatical representation of an exemplary hybrid engine drive welder.

Turning now to FIG. 1, an exemplary embodiment of an engine driven welder is shown. Of course, the embodiment shown is intended to be merely exemplary and not limiting in any way. As shown, the welder 100 has a housing 110 which encloses the internal components of the welder 100. The welder 100 has a front face 101, on which user input controls 103 are located. The input controls 103 are used to input various operation parameters, monitor system functions, and control the operation of the system 100. Also included on the welder 100 are output outlets 120. The outlets 120 can include connections for welding/cutting cables, auxiliary power outlets providing either 110 VAC or 220 VAC power, or any other type of output power they may be desired to be coupled to the system 100. The general construction, operation and function of hybrid engine drive welders is known and need not be described in detail herein.

Figure 2:
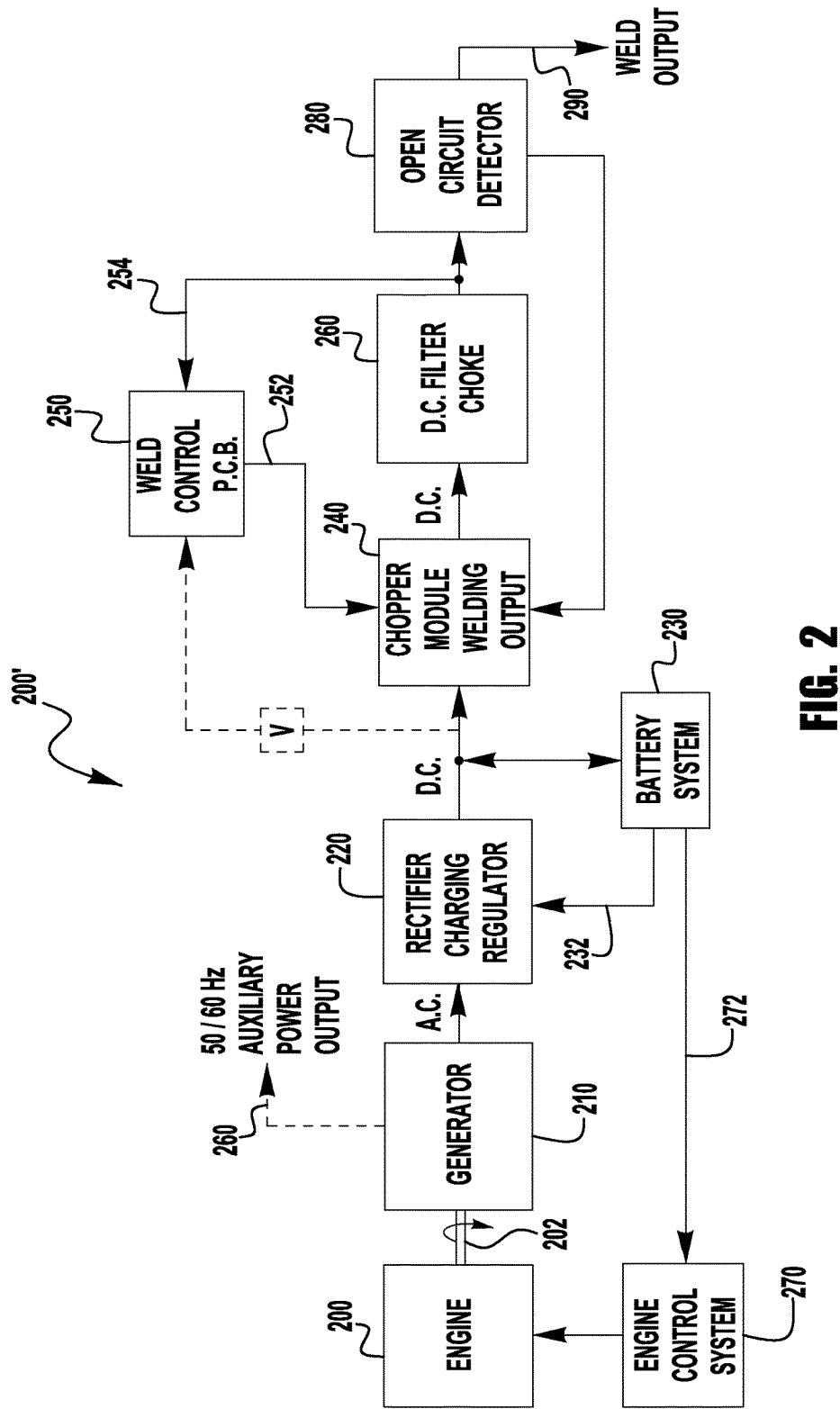
FIG. 2 is a diagrammatical representation of an electrical system of an exemplary hybrid engine drive welder.

Turning now to FIG. 2, an exemplary embodiment of an engine drive welding system 200' having an engine-hybrid design. It should be noted that the configuration shown in FIG. 2 represents an exemplary system 200 to show and describe an overall construction and operation of an engine drive-hybrid system. The overall functionality and structure of the system shown in FIG. 2 can be used with embodiments described herein with respect to FIG. 3A through FIG. 5, which the variations and differences described with respect to each of those Figures.

As shown in FIG. 2, engine 200 drives the electric generator 210 via a drive shaft 202. The electric generator generates an AC current which is rectified by the rectifier charging regulator 220. As illustrated in FIG. 2, electric generator 210 also can supply power to an auxiliary power output 260 for AC current. In addition, the AC current from generator 210 can be rectified and be partially directed to an auxiliary DC power output, not shown. The DC current from rectified charger regulator 220 is directed into battery system 230 to charge the battery when a feedback signal 232 indicates that the battery needs to be and/or is available for charging. The DC current supplied from the battery of battery system 230 is directed into a chopper module welding output 240 which is used to form the desired current waveform during an arc welding process. The D.C. current from the rectified charge regular 220 can also be directly fed in the chopper module welding output 240. As such the D.C. current from the rectified charge regular 220 can be used to only charge battery system 230 or be used to both charge battery system 230 and supply current to chopper module welding output 240.

An engine control system 270 is provided to control the operation of engine 200. The engine control system receives a signal via line 272 from the battery system, which signal is representative of the charge on the battery system. When the battery system is fully charged, the engine control system slows or turns off engine 200. When the battery system is less than fully charged and/or below a predefined charge level, the engine control system causes the engine to increase in speed and/or be turned on.

Weld control 250 controls the chopper welding output via signal 252 based upon output current information received via line 254. FIG. 2 also illustrates that weld control 250 can additionally receive voltage information from the DC current being directed from battery system 230 to chopper module welding output 240. The DC current from the chopper welding output is directed into a DC filter choke 260 to smooth out the DC current used for forming the welding arc.

An open circuit detector 280 is provided to determine whether an arc is being formed or is about to be formed between the electrode and workpiece during a welding operation. When open circuit detector 280 does not detect an arc, the open circuit detector causes the chopper module 240 to turn off, thereby reducing a drain of power from the battery system. In one non-limiting design, the voltage level between the workpiece and electrode is monitored to determine the current state of the arc.

As illustrated in FIG. 2, all the current directed to the weld output is supplied by battery system 230. In order for the battery system 230 to supply the total current to the weld output 290, the size of the battery system is selected to have an adequate amp-hour size which can supply the maximum power rating of the welder for a sufficient period of time. Typically, the duty cycle for most manual stick welding is about 20-40%. As a result, during a period of about 10 minutes, an electric arc is generated for only two to four minutes. The size and amp rating of the battery system 230 must be sufficient to at least supply a full amount of power to the electric arc during this duty cycle in order to obtain a proper electric arc during an arc welding process. During the time that an electric arc is not generated, the rectifier charging regulator 220 directs DC current into battery system 230 to recharge the depleted battery system. It is desirable to select a battery which can rapidly recharge so that during the intermittent periods of time wherein an electric arc is not being generated, the battery can be rapidly recharged so that it will be able to generate an electric arc during a subsequent duty cycle. Typically, the amp-hour size of the battery is selected so as to provide the arc welding requirements for the maximum welding output rating of the welder for at least about one minute, and typically about 5-45 minutes.

As can be appreciated from the design and operation of the hybrid energy source for welder A, the size of engine 200 and electric generator 210 need not be sized to provide the maximum welding output rating of the welder. The size of engine 200 and electric generator 210 only needs to be sufficiently sized to provide enough current to the battery of battery system 230 to adequately recharge the battery after the battery has been partially discharged when forming an electric arc. For instance, if the maximum welding output rating of a welder is 10 kW of power, and the maximum average duty cycle for a welding operation is 40%, the engine and electric generator only needs to produce sufficient current to supply 40% of the maximum welding output rating since only this much current is being discharged by the battery system during a particular duty cycle for the welder. As a result, the size of the engine and the size of the electric generator can be significantly decreased by using the hybrid energy source of the present invention. In addition to the cost savings associated with using a smaller engine and electric generator, the efficiency rating for the use of the current generated by the electric generator is significantly increased since most of the current is used to recharge the battery after it has been partially discharged during the formation of an electric arc. In the past, only 20-40% of the current generated by the electric generator was used in welding operations when the duty cycle was about 20-40%. In addition to the increase in energy usage efficiency, the size of the motor needed to provide sufficient power to meet the maximum welding output rating of the welder is decreased since a smaller engine is needed to power the hybrid energy source. Another benefit of the hybrid energy source is the ability of the welder to generate a welding current without having to operate engine 200 and electric generator 210. When battery system 230 is fully charged, the battery system has an adequate amp-hour size to provide the welding arc requirements during a particular period of time. As a result, the welder can be used in locations where the running of an engine powered welder is unacceptable due to noise and/or engine exhaust issues.

Turning now to FIGS. 3A and 3B an exemplary embodiment of the present invention is shown. Traditional hybrid-engine drive welding power supplies are large, bulky systems because of their need to house an engine, generator, gas tank and all other components needed to provide the desired operational functions. As such, these systems are large, heavy and difficult to move to remote locations. However, in certain circumstances power is desired in locations where a traditional system is too big to be moved to, or otherwise too difficult to get to the desired location, and the use of long power cables is not desirable. The embodiment shown in FIGS. 3A and 3B addresses these issues by providing a modular hybrid-engine drive welding system 300.

The system 300 is comprised of two modular sections 300' and 300", each of which can be fully enclosed in a housing 310 (like the one shown in FIG. 1). However, in this exemplary embodiment, a power module 300" can be removed from the housing 310 and taken to another remote location and be used to provide an output power even though the module 300" is separated from the engine and generator—which are in the primary module 300'. This will be described more fully below.

As shown in FIG. 3A each of the primary module 300' and the removable power module 300" are positioned within a housing 310. In this configuration, the system 300 can operate very similar to the system described above in FIG. 2. In the embodiment shown, the primary module 300' contains the engine 321, the generator 323 and a system controller 325. The controller 325 controls and monitors the operation of the system 300 and its components as in traditional engine drive systems (see, e.g., controller 270). The controller 325 can also be coupled to a user interface 327 which is positioned on the housing 310 or on a face of the housing where a user can input information as needed. When the two modules are secured together this user interface 327 can be the primary user interface for the system 300 and be used to control the entire operation, as needed. The engine 321 and generator 323 can generate power as described herein, or like other known engine drive systems. The controller 325 is also coupled to a wireless (or wired) communication device 329, such as a receiver/transmitter circuit, which is capable of communicating with other systems and components. For example, the communication device 329 is capable of communicating with a communication device 339 in the removable power module 300", as described below. Although not shown, the primary module 300' can also contain circuitry like the rectifier 220 shown in FIG. 2, and other circuits and systems which are needed to convert power from the generator 323 to power which can be used by the system 300. In some exemplary embodiments, when the module 300" is physically coupled to the module 300' the controller 325 can control the entire operation of the system 300, while in other embodiments, the controllers 325 and 333 can work together.

Removably coupled to the primary module 300' is a removable power module 300". The removable power module 310" contains at least an energy storage device 331 (similar to 230), another controller 333 (see, e.g., item 250 in FIG. 2) and an output power converter 335. The output power converter 335 can be any circuit or system that is capable of generating the desired output power from the generator and/or the energy storage 331. The output power converter 335 can generate both welding power which is either synchronous or asynchronous, and can also generate synchronous output power which can be sent to outlets (e.g., 110 or 220 VAC) which can be used by auxiliary devices, such as tools, etc. The controller 333 controls the operation of the components within the removable power module 300" similar to the controller 250 in Figure, or other known engine drive devices. Further, when the removable power module 300" is coupled to the primary module 300' the controller 333 can work with the controller 325 to control the operation of the entire system 300 (or the controller 325 can be the only used controller in some embodiments). The controller 333 is also coupled to a communication device 339, which can communicate either wirelessly or via wired communication (or both). In alternative embodiments, the controllers can communicate via a wired connection (e.g., through connection 343) when they are physically coupled, and then switch to wireless communication when separated. In the configuration shown in FIG. 3A the two modules 300' and 300" are secured to each other via releasable mechanical connections 341 and 342. These mechanical connections 341/342 can be any type of mechanical connection (e.g., latch, fasteners, etc.) which are can hold the two modules 300' and 300" in a physically secure, but easily removable relationship. However, the fasteners are also releasable such that the power module 300" can be physically released from the primary module 300'. Further, each of the modules will have electrical couplings so that an electrical connection 343/344 can be made to electrically couple to the two modules together. Thus, when secured together the two modules 300' and 300" can operate similar to known hybrid-engine drive welders. The power module 300" also has power outlets 351 and 353 so that the generated power can be provided to outside loads. For example, the outlets 351 can be coupled to welding cables so that a welding operation can be performed, and the outlets 353 can be auxiliary power outlets to which accessories, etc. can be coupled. However, unlike known systems, the power module 300" is removable and can be used remotely from the primary module as described below. When the two modules 300' and 300" are coupled to each other as shown in FIG. 3A the power output of the system 300 can be consistent with known engine drive power supplies, and can have an average peak current output as high 400 amps. Of course, other embodiments can have a higher, or lower peak output as needed.

FIG. 3B shows the two modules 300' and 300" separated from each other. Unlike known systems, the removable power module 300" can be removed from the primary module 300' and taken to an even more remote location to provide power. In such situations, the energy storage device 331 provide the necessary energy for the output power converter 335 to provide the desired output power. In some exemplary embodiments, when removed from the primary module 300' the battery 331 provides power to be used for a welding output through the outlets 351. In other exemplary embodiments, the battery 331 provides energy to the output power converter 353 which generates output power to be used by the auxiliary outlets 353 to power accessories, etc. This power can be either synchronous or asynchronous, as the demand requires. For example, exemplary embodiments can be configured such that the power module 300" is only capable of providing synchronous auxiliary power to the auxiliary outlets 353 because the energy storage device 331 (battery) cannot provide sufficient energy for a welding operation. Thus, unlike known engine drive welders, embodiments of the present invention have a removable power module 300" that can be removed from the primary module 300' and taken to an even more remote location to provide a temporary welding/auxiliary power source for a given requirement, whereas when the two modules are coupled they operate like a single hybrid-engine drive welder/power supply. Such flexibility is not achievable with known systems. Thus, in some embodiments, the module 300" can have an output capability which is less than that of when the module 300" is coupled to the module 300'. For example, in some exemplary embodiments the maximum average output current for the module 300"—when it is separated—can be 100 amps. However, when the module 300" is connected to the module 300' the maximum average current that can be supplied by the module 300" can be as high as 400 amps. In some exemplary embodiments, the ratio of average peak current that can be supplied by the module 300" from its connected state to its non-connected state can be in the range of 2 to 1 to 5 to 1. For example, in an exemplary embodiment, when connected the module 300" can provided a peak average current of 400 amps, but when disconnected the same module can only provide a peak average current of 100 amps—a ratio of 4 to 1.

Further, as shown in FIG. 3A, the power module 300" has its own separate user interface 337 which allows a user to operate the functionality of the power module 300" separately from the primary module 300'. Specifically, when the power module 300" is separated from the primary module 300' a user can interact with the power module via the user interface 337 and control the operation of the module 300" without the need of the primary user interface 327. In some exemplary embodiments, the user interface 337 is not accessible when the power muddle 300" is inserted into the housing 310 and coupled with the primary module 300'. However, in other exemplary embodiments, the user interface 337 can be positioned such that a user can interact with the user interface 337, or at least view the interface 337 when the power module 300" is inserted into the housing 310. For example, the user interface 337 can display the charge state, etc. of the energy storage device 331 to allow a user to understand the charge status, etc.

Further, the power module 300" also has a communication device 339 which is similar to the device 329 in the primary module 300'. The communication module 339 allows the power module 300" to communicate, either wirelessly or via a wired connection, with the primary module 300' and any other appropriate device. For example, a remote control device or pendant (not shown) can be used to communicate with the primary and power modules. The pendant/remote controller can be used to monitor the operation, function of the modules and/or control their operation.

Because the power module 300" is removable the internal structure of the system 300 can have a track or rail structure (not shown) that allows the power module 300" to be easily removed and reinserted as needed. The track/rail system also allows the power module 300" to be engaged with the primary module consistently so that the connections 341 and 342 can be consistently made.

FIG. 3B depicts the system 300 shown in FIG. 3A with the power module 300" separated from the primary module 300'. As discussed above, the power module 300" is removable from the system 300 and can operate separate from the primary module 300'. Specifically, in some exemplary embodiments, the power module 300" can provide a welding/cutting power from the energy storage device 331 and/or can provide synchronous auxiliary power, as discussed above. The module 300" can be taken to any desired remote location to provide the power needed. When the remote usage of the module 300" is completed and/or the battery 331 is depleted, the module 300" can be returned to the primary module 300' and the energy storage device 331 can be recharged.

In some exemplary embodiments, the power module 300" communicates (via the device 339) with the primary module 300' while they are separated from each other. In such embodiments, the status of the power module 300" can be monitored on the user interface 327. Further, the user interface 327 can be used to control the operation of the power module 300" via the communication devices 329 and 339. In exemplary embodiments, the controller 325 monitors the usage of the module 300" via the communication devices and when the energy storage device 331 gets below a threshold charge level the controller 325 starts the engine 321 to and prepares the module 300' to charge the device 331 upon return the of module 300". For example, either (or both) of the controllers 325/333 can determined a remaining usage time or a charge level of the storage device 331 (e.g., below 10% charge, or less than 10 minutes of usage time remaining), and based on that determination cause the engine to be started automatically in anticipation of the returning module 300". This will save time by having the primary module 300' prepare for a charging operation prior to the physical connection of the two modules. Similarly, in other exemplary embodiments, a user can use the user interface 339 on the power module 300" to turn on the engine 321 via the communication devices 329/339 and thus have the primary module 300' warmed up and ready for charging prior to engagement of the two modules. For example, during use of the power module 300" a user notices that the energy charge level of the storage device 331 is below a desired level. The user can then use the interface 337 to start the engine 321 of the primary module 300' so that the recharging of the device 331 can begin as soon as the module 300" is recoupled with the module 300'.

In other exemplary embodiments, the communication devices 329 and/or 339 have mobile communication and GPS location capabilities, so that their respective locations can be determined relative to each other. This will allow a user of the primary module 300' to easily locate the power module 300" that is associated with the system 300. The implementation of mobile GPS positioning technology is generally known and need not be discussed in detail herein. In other exemplary embodiments, the GPS positioning information can be used to disable the functionality of the power module 300" if the power module 300' is moved to a location which is outside of a desired range. For example, it may be desirable to keep the power module 300" within 200 yards of the primary module 300', and when either or both of the controllers determined that this distance has been exceeded the function of the power module 300" can be disabled. This can aid in preventing theft, or otherwise moving the power module to an undesired location.

In some exemplary embodiments, a cable connection 360 can be provided between the primary module 300' and the power module 300" to allow for remote charging of the battery 331. In such embodiments, a cable 360 can be coupled at the connections 344 to provide the charging energy to the battery 331. Additionally, in such embodiments, the cable 360 can allow for the full welding operation of the system 300 (for example, using the generator power to provide the welding power) while the module 300" is positioned remotely from the module 300'.

FIG. 3C is a further exemplary embodiment of the primary module 300', where the module 300' has an auxiliary power circuit 370 and at least one outlet 371. That is, in some applications, it may be desirable to continue to provide auxiliary power (for tools, lights, etc.) at the location of the primary module 300' even after the power module 300" is removed. In this embodiment, the generator and engine can still be used to provide power to the auxiliary power circuit 370, which delivers the power to the outlets 371. Thus, any tools or accessories can still be used even though the power module 300" is located at a remote location and being used for another purpose.

Figure 3D:
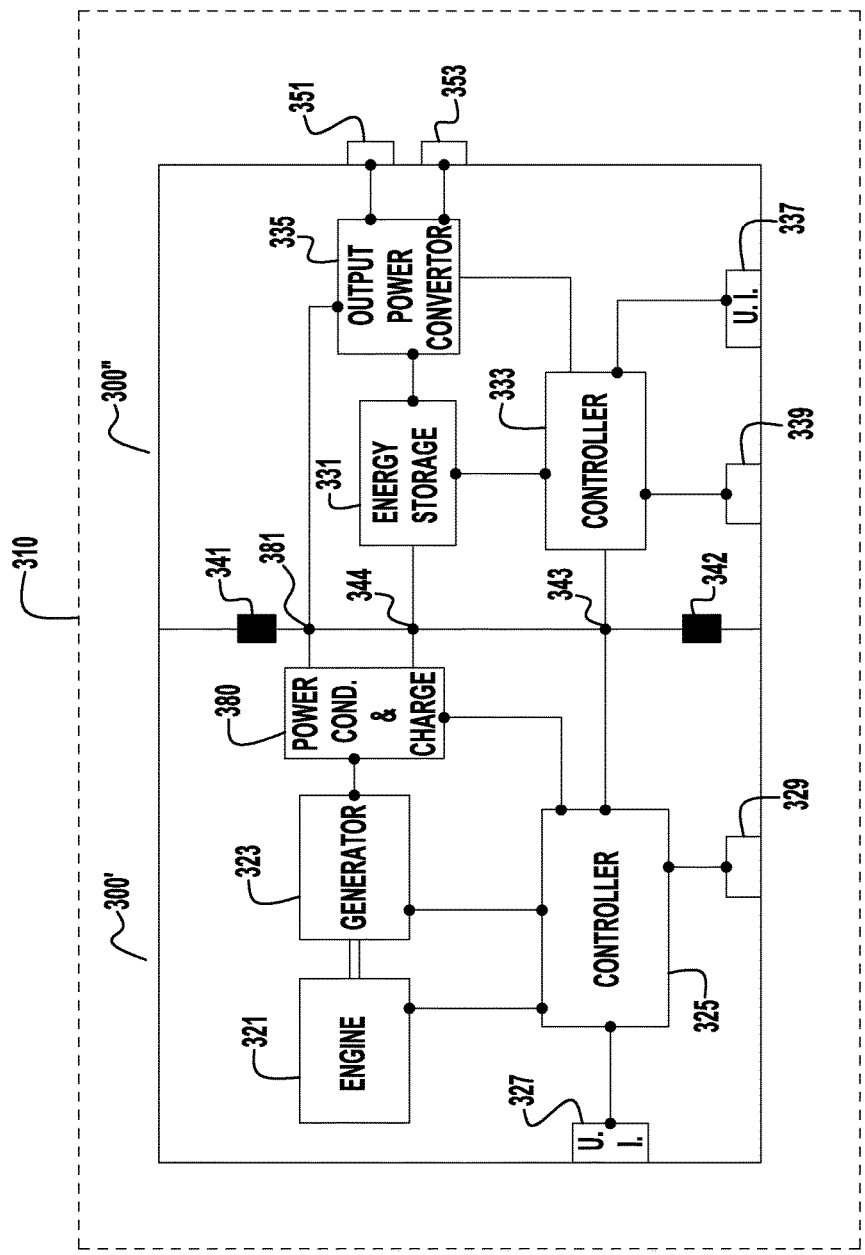
FIG. 3D is a diagrammatical representation of an additional exemplary embodiment of the system shown in FIGS. 3A and B.

FIG. 3D depicts a further exemplary embodiment of the present invention, where a power conditioning and charging circuit 380 is positioned within the module 300'. This circuit receives the power from the generator 323 and conditions the power to be used by the energy storage device 331 and/or the output converter 335. This circuit 380 converts the power from the generator so that it is usable by the energy storage device and/or the output converter. When the module 300" is coupled to the module 300', through the connections 344 and 381, the circuit 380 can charge the energy storage device 331 or provide power to the output converter 335 directly, depending on the desired functionality. Further, in other exemplary embodiments, the circuit 380 can provide power to each at the same time. Additionally, while it is shown that the circuit 380 is positioned within the module 300' in FIG. 3D, it can also be positioned within the module 300". Further, in some additional embodiments such a conditioning circuit 380 can be made as part of the generator so that the power from the generator circuit can be readily used as needed within the system 300.

Figure 4:
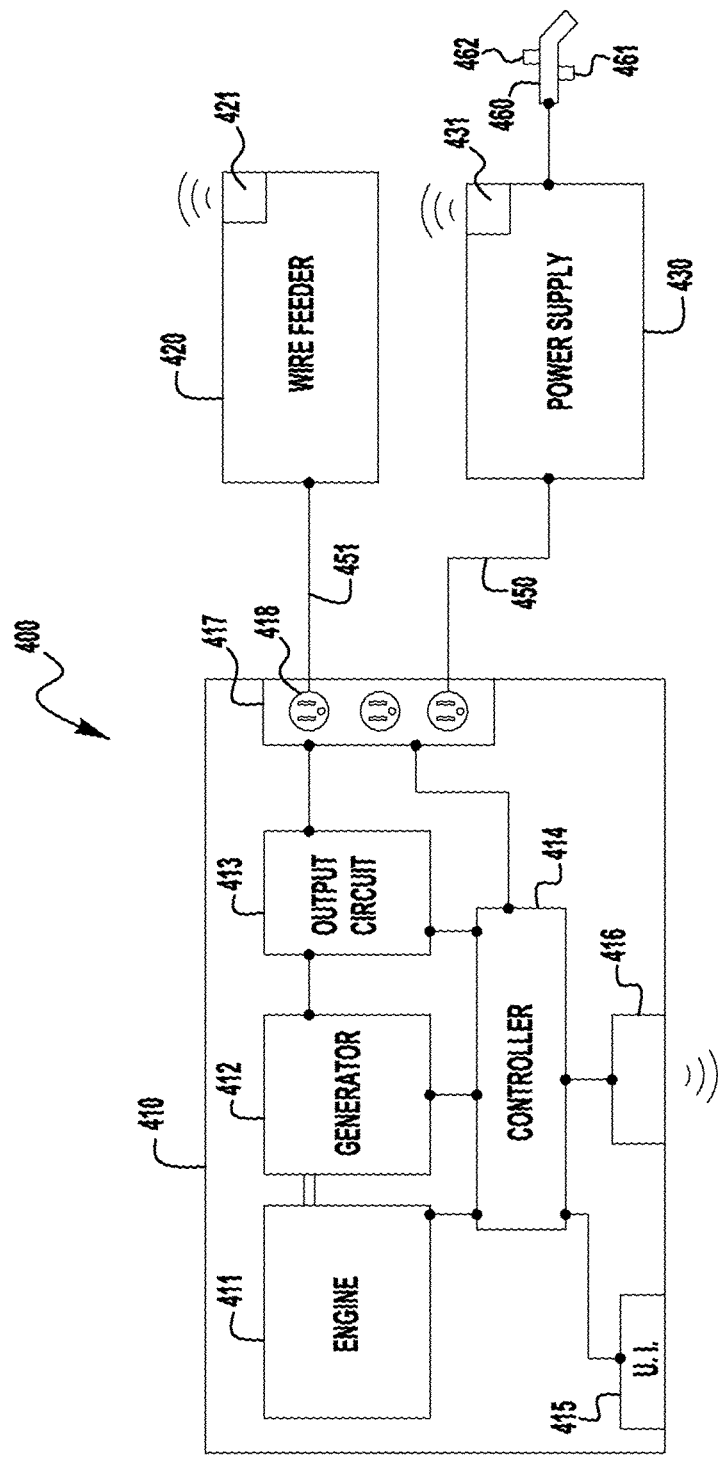
FIG. 4 is a diagrammatical representation of a second exemplary embodiment of the present invention where the embodiment is capable of communicating with coupled welding components.

FIG. 4 depicts another exemplary embodiment of the present invention. In this figure, a system 400 is shown having an engine drive power supply 410, a wire feeder 420 and a welding/cutting power supply 430. The power supply can be a hybrid engine drive power supply as shown in FIG. 2, or constructed similar to known engine drive power supply devices. In fact, the power supply 410 can be constructed similar to that discussed in FIGS. 3A to 3C. As shown in this embodiment, the power supply 410 has an engine 411 which is coupled to a generator 412 to provide an output power to an output circuit 413. The output circuit 413 generates a synchronous power signal, which can be any of 120, 230, 380 and/or 460 VAC at 50/60 Hz. In other exemplary embodiments, other synchronous VAC signals can be provided. This output is provided to the outlet circuit 417 which has at least one outlet 418. This synchronized output power signal is neither a welding or cutting signal, but is a synchronized power signal that can be used by various loads (power supplies, devices) that are typically coupled to utility grid power outlets or other synchronized load sources. Each of the loads 420 and 430 are capable of using the synchronous output signals to power their operation. The controller 414 is used to control the operation of the power supply 410 and is coupled to the user interface 415, which can be used by the user to control the operation of the power supply 410, and the other components as shown. Further, the power supply 410 has a communication device 416 which is capable of transmitting and receiving data from any of the loads 420/430 (each of which has its own communication device—421 and 431, respectively). Further, the communication device 416 can allow for communication with remote control/pendant devices and the like to allow for remote monitoring and control of the system 400 and the power supply 410. It should be noted that each of the exemplary loads, like the power supply 430 and the wire feeder 420, can be constructed like known systems, which include controllers, power conversion circuitry, etc. that are known to be used by such systems to accomplish their intended function. In each case, the controllers (not shown) of the feeder 420 and power supplies 430 are coupled to the respective communication circuits 421/431 so that status (and other information) of the devices 420/430 can be communicated to the controller 414. This is discussed further below.

In exemplary embodiments of the present invention, the power supply 410 communicates with each of the loads 420 and 430 (in the example shown a wire feeder and welding power supply) and each of the loads provide a predicted or anticipated load/power demand to the power supply 410 so that the power supply 410 can prepare for the load demand. This is explained further below.

In known engine/generator systems a synchronous power signal can be generated. However, with these systems the engine/generator system does not optimize the output of the synchronized power signal (e.g., 230 VAC) for dynamic conditions. For example, the welding output for a connected welding device may be set a high load/demand setting, but the engine/generator system providing the power may only be set at a low idle setting. This can create power/demand issues when there are high power demand operations, such as when a welding arc is struck.

Embodiments of the present invention address this, and other issues, by having the connected devices 420 and 430 communicate with the power supply 410 so that the power supply 410 is provided with an anticipated load demand and be ready to provide the desired power level when needed.

For example, as shown in FIG. 4, a wire feeder 420 and a welding power supply 430 are coupled to the synchronous outlet circuit 417 of the power supply/generator 410. The welding power supply 430 can be any known type of welding or cutting power supply that is designed to be coupled to a synchronous power outlet, such as those provided by a utility grid. However, the welding/cutting power supply 430 has a controller (not shown) and a communication device 431 which allows the power supply 430 to communicate with the engine drive power supply 410 via its own communication device 416 and controller 414. This communication can be via any known wireless or wired connection. With this communication link, embodiments of the present invention allow for the loads 420 and 430 to communicate with the power supply/generator 410 so that the generator can be prepared for the demand.

For example, if the load 430 is a welder or a plasma cutter, it may be set for an operational level which requires a high power demand at arc ignition. If the power supply/generator 410 is set at a low idle speed, this setting may not be sufficient to provide for smooth transition to the high energy demand of the load 430, during strike or arc ignition. Embodiments of the present invention address this issue by allowing for predictive communication between the load 430 and the power supply/generator 410 to ensure a proper operation of the loads. A discussion of an exemplary operation of the system 400 is set forth below.

In the system 400, when a load like a welding/cutting power supply 430 is coupled to the generator 410 a communication link is made between the components such that the power supply/generator 410 recognizes that the load 430 is coupled to it. This communication link can be made over the cable connection 450/451 between the components. The welding/cutting power supply 430 then communicates its power settings and/or changes in its power settings to the controller 414 of the power supply/generator 410, so that the controller can adjust the output of the power supply and/or the engine RPMs appropriately. For example, if the welding power supply 430 is set to weld at a current level of 200 amps or higher this information is communicated to the controller 414. Using this information, the controller 414 determines whether or not the engine RPMs are at the proper speed to ensure that the power demands of the welder for its operation/start are sufficiently met. If the RPMs of the engine are not at a proper RPM level, the controller 414 causes the engine speed to increase to the desired setting. Similarly, in other exemplary embodiments, if the engine RPMs are high relative to the power demand based on the settings of the load 430, then the controller 414 can slow the engine 411 so that fuel is not wasted.

Thus, in exemplary embodiments, the power supply 410 and the load 430 communicate with each other and the controller 414 of the power supply/generator 410 uses these communications to control the engine 411 and the operation of the power supply 410. That is, the controller 414 can use settings and/or operational set points of the load 430 to control its operation. In exemplary embodiments, if the controller determines that the RPM settings is too low it will cause the RPMs to increase, if the controller 414 determines that that the current RPM setting is acceptable then no change will be made, and if the controller 414 determines that the RPMs are too high, creating unneeded energy then the controller causes the engine to slow down. This ensures that an optimal engine RPM settings is maintained as needed and that any welding or cutting operation made via the load 430 is performed without any difficulty.

In further exemplary embodiments, the controller 414 can use predictive information from the power supply 430 to vary its output and/or engine operation during a welding operation. For example, the welding power supply 430 can communicate to the power supply 410 that a welding operation is about to start, and communicates information about the welding operation that is used by the controller 414 to control the operation of the power supply—including the welding operation type (pulse, stick, CC, CV, etc.), the average current for the welding operation etc. With this information the controller 414 causes the engine/generator and output circuit to prepare to deliver the power needed to start a welding operation. In many instances, because of the high current demand for an arc start, the output power needed at the start of a welding operation can be higher than that needed for the main portion of the welding operation. Thus, in such exemplary embodiments, the controller 414 causes the power supply 410 to prepare for an arc start—and the associated power demand (e.g., increase engine speed, etc.) and then once the arc start is confirmed by the welding power supply 430 to the power supply 410, the controller 414 can cause the engine 411, and other components, to settle into a mode of operation needed for the welding operation. For example, the controller 414 can determine—prior to a welding operation beginning—that for a given welding operation the engine 411 will need to provide 1,500 RPMs for the arc start aspect of the weld process, but after the arc starts the engine will only need to provide 1,200 RPMs for the remainder of the weld process. Thus, once the arc start is communicated, the controller 414 causes the engine 411 to slow down as needed. This has the advantage of optimizing the use of the engine 411, and the power supply 410.

In further exemplary embodiments of the present invention, the controller 414 does not cause a change in engine RPM until the demand is actually needed. For example, in any given welding/cutting operation there may be an appreciable delay between inputting the operational settings on the welder/cutter 430 and actually performing the operation. Thus, it is unnecessary to have the RPMs of the engine 411 increased if the actual demand for the increased RPMs will not be needed for a period of time. Therefore, in some exemplary embodiments of the present invention a user can generate an input signal either on the welder 430 and/or on a torch/gun 460 coupled to the welder 430. For example, a user can input a current setting at the welder 430 of 300 amps for a given welding operation. This setting can be communicated to the power supply 410 and/or the controller 414 can query the controller of the welder 430 to obtain its operational settings. Based on this information, the controller 414 determines the appropriate RPM setting for the engine to ensure the appropriate power is available to the load 430. However, the controller 414 does not initiate the RPM change (if needed) until a user input is received that the welding/cutting process is about to begin. For example, the user can interact with a user input panel/device on the load/welder 430 or on a torch 460. This interaction can send a signal to the controller 414 indicating that the load demand will be imminent and so the controller 414 causes the engine RPM speed to change to the desired level. For example, the torch/gun 460 can have a switch 461 which is activated by the user to indicate that he/she is ready to begin the operation. This data input can be used by the controller 414 to increase the RPMs. For example, the system can be configured such that the controller 414 will not make any changes to the output power of the power supply 410 and/or any change in engine speed until after a predetermined period of time after a user input. In some exemplary embodiments, this time can be in the range of 1 to 10 seconds. As an example, (1) a user enters information about a welding operation to the welding power supply 430; (2) this information is communicated to the controller 414, along with any load information for any other device—such as a wire feeder 420; (3) the controller 414 uses this information to determine an appropriate output power and/or frequency for a welding operation, along with an appropriate RPM speed for the engine 411; (4) the controller waits to detect a user input indicating that the process is about to begin—for example, from a switch 461 on the gun 460, power supply 430, or any other means; (5) after an amount of time—e.g., between 1 and 10 seconds—the controller 414 causes the engine speed to change (if needed) so that the appropriate power can be provided by the power supply 410; and (6) the welding process can begin. Similarly, exemplary embodiments can use similar user input to slow down/shut off the power supply 410 when the power output is not needed. For example, the power supply 430 can communicate to the controller 4141 that the load is no longer needed and/or a user input can indicate that the higher power output is not needed. As an example, when a user is done welding the user can use the same switch 461 on the gun 460 or on the power supply 430 to indicate that the process is completed and the controller 414 uses this indication to slow down the engine 411 to an idle speed to wait for the next operation. This can greatly increase the operational efficiency of the power supply 410.

In further exemplary embodiments of the present invention the controller 414 can operate the system 410, including the engine 411, to provide a synchronous output power which exceeds the determined anticipated power or load demand. This is done to account for situations in which there may be unexpected peaks or spikes in the power demand or other unexpected increases in the demand for the synchronous power—which could also include the turning on, or plugging in, of another device in the outlet circuit 417. For example, if it is determined by the controller 414 that the synchronous output of the system 410 needs to be 5 kW based on information from the devices 420/430, the controller 414 controls the engine 411 such that an output power of 5.25 kW is provided—a 5% increase. This can aid in smoothly dealing with unexpected power demands/spikes. In some embodiments, the controller 414 can control the engine such that at least a 3% power increase is provided over the total anticipated load, while in other embodiments at least a 5% increase is provided. In even further embodiments, at least a 10% power increase can be provided. Further, in some embodiments, the % increase over the determined power need can be based on the type of load, or other information, from the devices 420/430. For example, if a welding/cutting process is to be used that has a relatively low chance of requiring power spikes, the controller 414 can controller the engine 411 such that only a 3% power increase is provided above the anticipated load, but if the process has an increased chance of requiring power demand spikes, the controller 414 can set the engine speed 411 such that at least a 10% increase in the available synchronous power is provided. Thus, in such embodiments, the controllers of the systems—such as the power supply 430—communicates a type of process to be performed, or any type of procedure or process identifier—which is used by the controller 414 to determine an available power increase factor. That is, for example, for some processes/procedures the controller 414 will use a 3% power increase factor, for others it will be a 5% increase factor, and yet for others it will be a 10% increase factor. In further embodiments, this increase factor can be set by a user via the user interface 415.

In a further exemplary embodiment, the switch 461 can also be the trigger that is commonly used on known torches/guns. For example, the user can initiate a quick double-toggle of the trigger 461 and this double-toggle signals to the controller 414 that the process is about to begin, at which time the controller 414 initiates the needed RPM change. After the double-toggle the user would wait for a period of time before starting to give the engine 411 time to reach the desired RPMs. For example, the user can wait 1 to 10 seconds and then begin the desired operation. Again, a second double toggle can be used to indicate that the process has been completed and that the engine can slow down.

In another exemplary embodiment, the torch/gun 460 can have an indicator 462 which will provide a visual indication to the user that the engine 411 is at the appropriate RPMs for the desired operation, and upon seeing the indication the user can begin the desired operation. For example the indicator 462 can be an LED, or similar type device, which can glow green, or any other desired color, to indicate to the user that the generator 410 is at the appropriate power level for the given operation. The indicator 462 can also be used to provide other indications, including: (1) an indication that the power supply 410 is not ready (e.g., red); and/or an indication that the welding/cutting process is reaching/exceeding the output capacity of the power supply 410 (e.g. a flashing red indicator). Of course, other indications can also be provided.

With these exemplary embodiments, a welding/cutting power supply 430 can be coupled to a generator 410 which provides a synchronous output signal via outlets 418 and the system 400 ensures that the needed output power is available at the outlets 418 when needed to ensure proper cutting and/or welding operations. Of course, it should be noted that other exemplary embodiments not be limited to using welding or cutting power supplies, but other devices which require a synchronous power signal can be coupled to the generator/power supply 410 and operate similar to the discussions set forth above.

As shown in FIG. 4, multiple devices 420/430 can be coupled to the generator/power supply 410, where each of these devices can communicate with the controller 414 as described above, so that the controller 414 can determine/anticipate the appropriate RPM setting needed to provide the desired power at the outlets for each coupled device 420/430. Thus, embodiments of the present invention can determine the combined demand from multiple devices 420/430 and control the operation of the engine/generator in anticipation of that demand so that the needed power/energy is available when needed. That is, the controller 414 can receive anticipated power or load signals from each of the connected devices/loads 420/430 and utilize (e.g., sum) this information to determine a total load needed for operation of the engine 411. However, in other exemplary embodiments, the respective controllers (not shown) of the systems 420/430 can simply send operational and/or load data and the controller 414 uses this data to determine the total load demand needed by the system 410. In such embodiments, rather than the devices 420/430 sending an anticipated power load data, the controllers send other operational data which is used by the controller 414 to determine the load demand, which is then used to determine the appropriate RPM speed for the engine 411. Further, in other exemplary embodiments, some devices, such as the wire feeder 420 can have identification ability, such that the controller 414 recognizes the attached device (i.e., wire feeder 420) and based on that recognition determines a load requirement for that device based on stored memory regarding that device. Such recognition ability is known and need not be described in detail herein.

It is also noted that further exemplary embodiments need not be limited to welding/cutting applications, and exemplary embodiments similar to that shown in FIG. 4 can be utilized in numerous different applications. For example, turning to FIG. 4, the welding/cutting power supply 430 and the wire feeder 420 can be replaced with any devices/systems which require electrical power and can be coupled to a engine-drive power generation device. For example, the devices 420/430 can be devices such as air compressors, a construction trailer, air conditioner, etc. Any of these electrical systems (i.e., electrical loads) can have a controller and communication device/system (such as the ones discussed above) such that they can communicate with the power supply 410 and provide an anticipated load signals so that the controller 414 can prepare the system 410 to provide the appropriate synchronous power—as described above. For example, any one of the systems can be an air conditioner with the capabilities discussed above to determine/send an anticipated load signal to the controller 414. In exemplary embodiments, the air conditioner 420/430 can send a load ramp signal or an anticipated load signal to the controller 414 before the air conditioner (or any other type of electrical load) starts is load cycle. Thus, as discussed above, the controller 414 can cause the engine 411 to be brought up to the appropriate RPMs to generate the appropriate power prior to the actual demand for the load.

Further, in additional exemplary embodiments, the controller 414 can speed up the engine 411 (consistent with the discussions above) prior to engaging a clutch between the engine 411 and the generator 412, such that the engine reaches the desired RPMs before the clutch is engaged. Because the use of clutches to couple generators and engines is well known, their use and structure need not be described herein.

Figure 5:
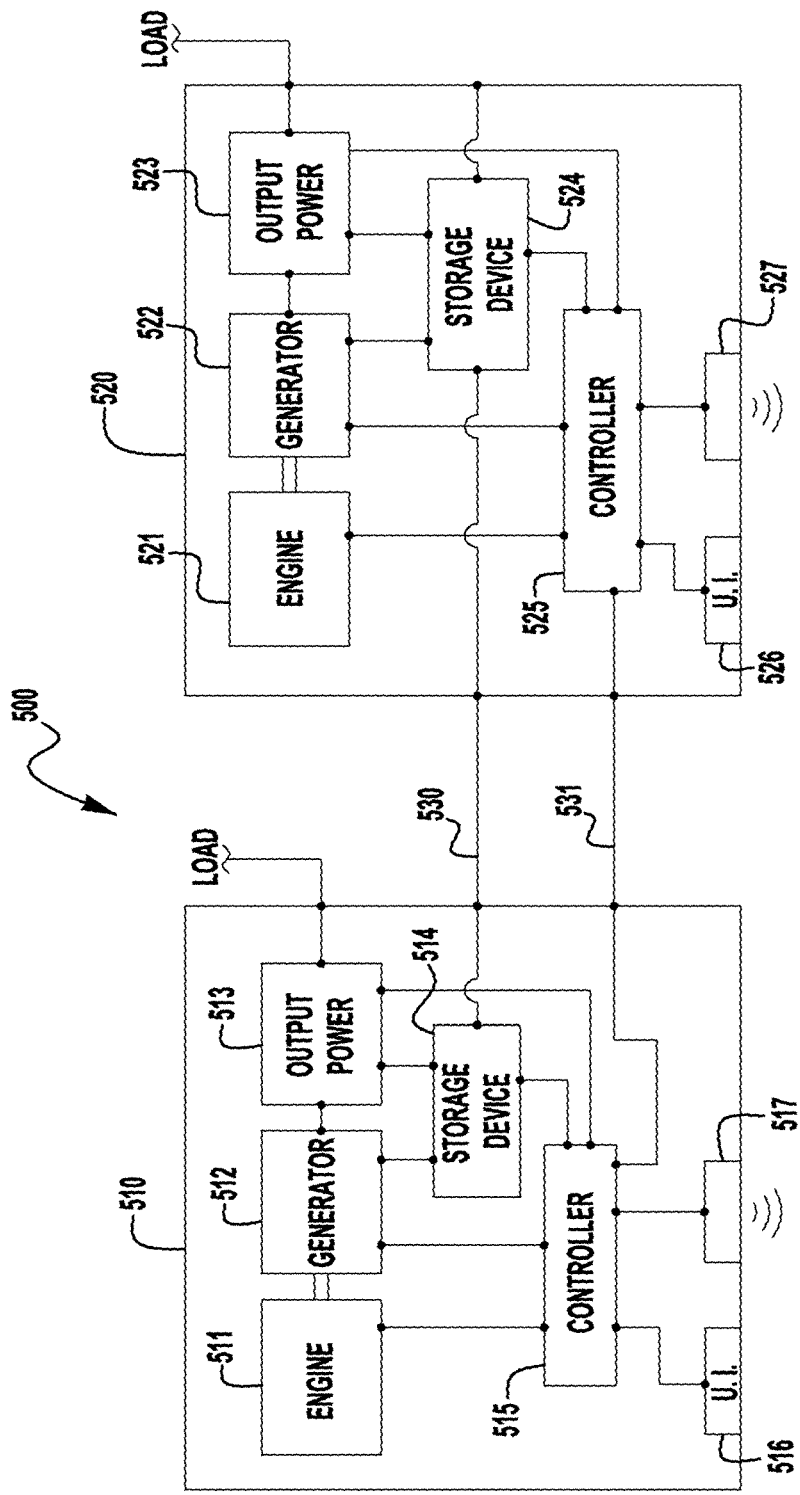
FIG. 5 is a diagrammatical representation of a third exemplary embodiment of the present invention where the embodiment can be coupled to an additional welder for purposes of charging, etc.

FIG. 5 is a further exemplary embodiment of the present invention, where a system 500 comprises at least two hybrid-engine drive power supplies/generators (e.g., welders) which are coupled to each other as shown. Each of the generators 510/520 can be constructed similar to known hybrid-engine power supplies, with the differences discussed herein. For example, the generators 510/520 can be constructed similar to the system discussed in FIG. 2 or FIGS. 3A to 3C herein.

As discussed above, the use of engine drive system with energy storage devices is generally known. In these systems, the engine and generator are used to recharge an energy storage device (e.g., battery) used in the system to provide power to the welding/cutting operation. However, in most systems the engine-generator combination is capable of outputting more power than the charging rate of the energy storage device. Thus, in situations where there are multiple hybrid engine drive welders/generator present the additional engine capacity is not being used efficiently. Exemplary embodiments of the present invention address this by efficiently using excess energy.

As shown, each of the generators 510/520 can be similarly constructed, in that they each can contain an engine 511/521, generator 512/522, output power circuit 513/523, an energy storage device 514/524, a controller 515/525, a user interface 516/526, and a communication device 517/527. The generators 510/520 can be used to generate welding and/or cutting power and provide that output power to a load, such as a welding or cutting operation.

As shown in FIG. 5, in the depicted system 500 the controllers 515 and 525 are in communication with each other via a connection 531. While the connection is shown as a wired connection, this can also be via a wireless connection via the communication devices 517/527. Because of this coupling the power generators 510/520 can communicate with each other to implement embodiments of the invention as discussed herein. Further, as shown, the respective storage devices 514/524 are coupled to each other. Because of this coupling, a single engine 511 or 521 can be used to charge both storage devices 514/524.

As stated above, a typical engine/generator combination can generate power that exceeds the recharge rate of a storage device. Thus, in exemplary embodiments of the present invention, when multiple storage devices 514/524 are in need of charging, a single engine/generator can be used to charge both devices 514/524. In such embodiments, at least one controller 517/527 (which can be in a slave-master relationship) can determine that the storage devices 514/524 are in need of charging, and that the output power of a single generator 512 is sufficient to charge both storage devices 514/524. When this determination is made by the controller 515 and is communicated to controller 524, the controller 524 causes the engine 521 to be shut off, or at least reduced to an idle, or low idle speed so that the charging of both devices 514/524 is performed by only one engine/generator combination (e.g., items 511 and 512). This saves fuel in the second power generator 520, as the engine 521 need not run to charge the battery 524 in that system. This configuration is much more efficient than known systems.

In further exemplary embodiments, a single engine/generator combination can be used even when there are loads on each of the respective systems 510/520. For example, in certain situations a single engine/generator combination (e.g., 511/512) can generate enough average power to for the loads on each of the power supplies 510 and 520, such that, again, only a single engine need run to perform two welding operations. Thus, in exemplary embodiments, the output from a single engine/generator combination can be used to provide the output power for more than one engine-drive power generators (e.g., welders). In such embodiments, at least one of the controllers evaluates the load demand for each of the welders 510/520 and determines if a single engine/generator combination can supply the average power output to satisfy both loads. In further exemplary embodiments, at least one of the controller(s) compares for the power needed for both loads with the average power available from a single engine/generator combination and each of the respective storage devices 514/524 to determine if enough average power is available to sustain both loads as required with only a single engine running. If the combined loads have a power requirement before the available average power, then a single engine/generator combination is operated to provide the power to the loads (which can be welding or cutting operations, or a combination thereof). If the controller(s) determines that the loads require a higher average power than that available from a single engine/generator combination can provide, then the controller(s) can cause the other of the engine/generator combinations to provide the additional power needed. In such exemplary embodiments, the controller(s) can control the RPMs of the engines to ensure that the system 500 runs as efficiently as possible. That is, in some power demand applications it will be not necessary to run each system 510/520 at its full capacity, and thus waste fuel. For example, a controller(s) may determine that one engine 511 will need to run at full power while the other 521 only needs to operate at a lesser idle speed to provide the needed power. This, again, optimizes fuel efficiency while delivering the appropriate amount of power needed for both loads.

Thus, with the above described configuration, embodiments of the present invention can communicate respective storage device charge levels, available power output, and/or load information and demand between the controllers 515/525 so that the controllers can control the operation of the systems 510/520 in an optimal way.

In some exemplary embodiments, a control methodology can be used to ensure that an appropriate amount of power is available for a given operation. For example, if the system 520 is the only system being used for a given welding/cutting operation, but its load demand is near the capacity of the system 520, the other system 510 can be running, at a desired level, to provide any excess power as may be needed during a given operation. That is, if a given operation/load is close to the maximum output capacity of a single system 510/520, the other system can be running to provide any needed additional power, if a spike in power demand is needed. For example, if the power supply 510 is being used in an operation which requires between 90 and 100% of the maximum output power of the supply 510, the controllers 515/525 cause the power supply 520 to be running, at least in an idle state, to be ready for any conditions/events, that may cause the power demand by the load to spike over 100% of the maximum output power of the system 510. This can occur, for example, during short circuit events, restrikes, or any other events requiring a high power output for a limited duration. Thus, exemplary embodiments of the present invention allow the system 500 have the desired available power for needed events, while optimizing fuel and system efficiency. Of course, it should be noted that the output frequency of the systems 510/520 should be synchronized when providing output to a single load. In the embodiment discussed above, the second system 510/520 runs when the output of the operating system 510/520 is in the range of 90 to 100% of its maximum power output. However, in other exemplary embodiments, this range can be expanded, for example in the range of 85 to 100% of its rated maximum output power. Further, in exemplary embodiments of the present invention, the maximum rated output power may not be the absolute maximum output power for a system 510/520, but can be a set or predetermined maximum output power rating based on the construction and operation of the system and can be a power level at which normal operation of the system 510/520 can be sustained at an acceptable duty cycle. Of course, the maximum power output rating can be defined in other ways, without departing from the spirit or scope of the present invention.

In further exemplary embodiments, the controllers 515/525 can communicate relative fuel levels of each respective system 510/520. With this information, the controller(s) can determine which of the system 510/520 will be used to recharge both batteries and/or provide the loads for each of the system 510/520. For example, in an exemplary embodiment, the controller 515 can be the primary controller such that the system 510 is the default primary system to provide power when the engine 521 of the other system 520 is not running. The controller 515 monitors the fuel level in the system 510, such that when the fuel level drops below a threshold level the controller 515 will communicate with the controller 525 to cause the engine 521 to start up, assuming that the system 520 has a sufficient fuel level. This will allow for an uninterrupted supply of power to the respective loads and/or charging of the storage devices 514/524 without the need for user intervention to refill a gas tank.

The fuel threshold level can be preprogrammed and/or can be set by a user. In exemplary embodiments, the fuel threshold level is set above a zero fuel level to ensure that an engine does not run out of fuel. Thus, the controller(s) can determine which engine to run based on respective fuel levels in the respective systems 510/520. It is noted that the fuel tanks are not shown for reasons of simplicity, but the use and installation of fuel tanks in engine driven welder/generator are well known. In further exemplary embodiments, the controllers 515/525 can also share/communicate fuel efficiency information between the systems 510/520. This allows the controller(s) to determine which engine 511/521 to run based on the relative fuel efficiency of the systems 510/520. For example, the system 510 can have a better fuel efficiency at a given load demand, where the load demand is shared between the two systems 510/520. Based on this information, the controller 515 determines that the engine 511 and generator 512 will be operated to provide the power, while the engine 521 will not be operated. Then if the total load demand changes to a different level (either higher or lower) at which the system 520 is more fuel efficient, the controller 515 (and/or 525) can cause the engine 521 and generator 522 to turn on and provide the power, while shutting off the engine 511. This allows the system 500 to optimize fuel efficiency across a wide range of load demand situations, not currently obtainable by current systems. This also allows a system 500 to be used where each of the individual systems 510/520 have different fuel efficiencies at different power output ranges.

In further exemplary embodiments, the controllers 515/525 can also share error and status information of the systems 510/520. For example, the controllers 515/525 can share error or status information for their respective engines and generators, such that when an error is detected in one system 510 or 520, the controller(s) cause the power to be supplied by the other, non-fault, engine and generator combination. This ensures that the power to the respective loads can be provided, even though an error may exist in one of the systems 510/520. Thus, embodiments of the present invention can allow two separate welding operations to continue even though one of the engines and/or generators has failed. Further, this system allows for multiple energy storage devices 514/524 to be charged even though one engine/generator combination has failed or has performance issues.

In further exemplary embodiments, each of the systems 510/520 can be set up to run different processes at the same time. For example, the system 510 can be set up to run a STT type welding process, while the system 520 can be set up to run a pulse welding process (or any other different process), and if it is determined (by one or both of the controllers) that only one engine/generator is needed to provide the needed power, then one engine is run, and two different welding processes can be provided at the same time.

In view of the above, systems such as those shown in FIG. 5 greatly improve the flexibility and fuel efficiency of a welding system, using at least two engine drive power supplies. Of course, embodiments are not limited to just two engine drive systems, but any number can be linked together and operated as described above.

It should be noted that while the above embodiments related to FIG. 5 have been described as hybrid power supplies—having a storage device to supplement power output—other exemplary embodiments can be more conventional engine drive systems, and need not be hybrid systems. That is, in other exemplary embodiments, each of the systems 510/520 are conventional engine drive systems, having much of the structures described above, absent the additional storage devices 514/524. However, in such systems they function and operate similar as to that described above, and to the extent that the multiple power supplies are coupled to provide a single output power, their respective output signals are synchronized so that a single clean signal is provided. Thus, in such embodiments, if each system 510/520 were rated at a maximum power output of 10 kW, they can combine for a single output of 20 kW.

With referring to FIG. 5, with those embodiments that do not utilize hybrid welders (i.e., having the storage devices described above), the systems will have the generator 512 coupled to the output power circuit 523, and the generator 522 coupled to the output power circuit 513. With this configuration, the systems 510/520 can share power as described above such that an output signal can be provided from each system 510/520 when only one engine is running (as described above). Further, in additional exemplary embodiments, a further power conditioning circuit can be positioned between the generators and the output power circuits depicted in FIG. 5. These power conditioning circuits can configure the generator power to a power that can be used by the respective output power circuits without departing from the scope or spirit of the present invention. These circuits can condition the generator power such that it is smoothed, etc., and such circuits are known. Further, these circuits can be considered part of the generator circuits of each respective system 510/520.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

We claim:

1. A welding or cutting power supply, comprising: a first module comprising:
   an internal combustion engine; and
   a generator coupled to said internal combustion engine, where said generator generates electrical power; and
   a second module which is physically connectable to and detachable from said first module, said second module comprising:
   an energy storage device which receives said electrical power when said second module is coupled to said first module and uses said electrical power to charge said energy storage device, and where said energy storage device generates an output power;
   a power conversion circuit which is coupled to said energy storage device and which generates a welding or cutting output signal to be output from said second module;
   wherein when said second module is physically coupled to said first module said power conversion circuit uses at least one of said output power and said electrical power to generate said welding or cutting output signal;
   wherein when said second module is physically removed from said first module said power conversion circuit uses only said output power from said energy storage device to generate said welding or cutting output signal; and
   wherein when said second module is physically coupled to said first module said power conversion circuit has a first peak output power and when said second module is physically removed from said first module said power conversion circuit has a second peak output power which is less than said first peak output power.

2. The welding or cutting power supply of claim 1, wherein said first module further comprises a power conditioning and charging circuit coupled to said generator to receive said electrical power from said generator and output at least one of a charging signal and an output power signal, where said energy storage device receives said charging signal when said first and second modules are coupled to each other, and said power conversion circuit receives said output power signal when said first and second modules are coupled to each other.

3. The welding or cutting power supply of claim 1, wherein said first module has a first user interface to control operation of at least said first module and wherein said second module has a second user interface which controls the operation of said second module when said second module is removed from said first module.

4. The welding or cutting power supply of claim 1, wherein each of said first and second modules have a communication device such that said first and second modules can communicate with each other when said second module is separated from said first module.

5. The welding or cutting power supply of claim 1, wherein said first module has an auxiliary power circuit which receives at least some of said electrical power and generates an auxiliary power signal.

6. The welding or cutting power supply of claim 1, wherein a ratio of said first peak output power to said second peak output power is at least 2 to 1.

7. The welding or cutting power supply of claim 1, wherein a ratio of said first peak output power to said second peak output power is on the range of 2 to 1 to 5 to 1.

8. The welding or cutting power supply of claim 1, wherein said second module has a controller and a communication circuit which communicates with said first module when said first and second modules are separated, and wherein said controller and communication circuit transmit an engine start signal to said first module when said energy storage device falls below a threshold energy storage level.

9. The welding or cutting power supply of claim 1, wherein said second module contains a controller and a location device and wherein when said location device determines that said second module is remote from said first module by more than a predetermined distance said controller interrupts operation of said second module.

10. A welding or cutting power supply, comprising: a first module comprising:
    an internal combustion engine;

a generator coupled to said internal combustion engine, where said generator generates electrical power; and a power conditioning and charging circuit coupled to said generator to receive said electrical power from said generator and output at least one of a charging signal and an output power signal; and a second module which is physically connectable to and detachable from said first module, said second module comprising:

an energy storage device which receives said electrical power when said second module is coupled to said first module and uses said electrical power to charge said energy storage device, and where said energy storage device generates an output power;

a power conversion circuit which is coupled to said energy storage device and which generates a welding or cutting output signal to be output from said second module; and a first user interface which controls an operation of said second module when said second module is removed from said first module;

wherein when said second module is physically coupled to said first module said power conversion circuit uses at least one of said output power and said electrical power to generate said welding or cutting output signal;

wherein when said second module is physically removed from said first module said power conversion circuit uses only said output power from said energy storage device to generate said welding or cutting output signal;

wherein when said second module is physically coupled to said first module said power conversion circuit has a first peak output power and when said second module is physically removed from said first module said power conversion circuit has a second peak output power which is less than said first peak output power; and wherein said energy storage device receives said charging signal when said first and second modules are coupled to each other, and said power conversion circuit receives said output power signal when said first and second modules are coupled to each other.

11. The welding or cutting power supply of claim 10, wherein said first module has a second user interface to control operation of at least said first module.

12. The welding or cutting power supply of claim 10, wherein each of said first and second modules have a communication device such that said first and second modules can communicate with each other when said second module is separated from said first module.

13. The welding or cutting power supply of claim 10, wherein said first module has an auxiliary power circuit which receives at least some of said electrical power and generates an auxiliary power signal.

14. The welding or cutting power supply of claim 10, wherein a ratio of said first peak output power to said second peak output power is at least 2 to 1.

15. The welding or cutting power supply of claim 10, wherein a ratio of said first peak output power to said second peak output power is on the range of 2 to 1 to 5 to 1.

16. The welding or cutting power supply of claim 10, wherein said second module has a controller and a communication circuit which communicates with said first module when said first and second modules are separated, and wherein said controller and communication circuit transmit an engine start signal to said first module when said energy storage device falls below a threshold energy storage level.

17. The welding or cutting power supply of claim 10, wherein said second module contains a controller and a location device and wherein when said location device determines that said second module is remote from said first module by more than a predetermined distance said controller interrupts operation of said second module.

18. A welding or cutting power supply, comprising: a first module comprising:

an internal combustion engine;

a generator coupled to said internal combustion engine, where said generator generates electrical power; and a power conditioning and charging circuit coupled to said generator to receive said electrical power from said generator and output at least one of a charging signal and an output power signal; and a second module which is physically connectable to and detachable from said first module, said second module comprising:

an energy storage device which receives said electrical power when said second module is coupled to said first module and uses said electrical power to charge said energy storage device, and where said energy storage device generates an output power;

a power conversion circuit which is coupled to said energy storage device and which generates a welding or cutting output signal to be output from said second module; and a user interface which controls an operation of said second module when said second module is removed from said first module;

wherein when said second module is physically coupled to said first module said power conversion circuit uses at least one of said output power and said electrical power to generate said welding or cutting output signal;

wherein when said second module is physically removed from said first module said power conversion circuit uses only said output power from said energy storage device to generate said welding or cutting output signal;

wherein when said second module is physically coupled to said first module said power conversion circuit has a first peak output power and when said second module is physically removed from said first module said power conversion circuit has a second peak output power which is less than said first peak output power, and a ratio between said first and second peak power outputs is at least 2 to 1; and wherein said energy storage device receives said charging signal when said first and second modules are coupled to each other, and said power conversion circuit receives said output power signal when said first and second modules are coupled to each other.

* * * * *